(12) United States Patent
Yolar et al.

(10) Patent No.: US 8,407,393 B1
(45) Date of Patent: Mar. 26, 2013

(54) MODIFYING A DISK DRIVE WHILE PRESERVING CALIBRATED PARAMETERS STORED IN A NON-VOLATILE SEMICONDUCTOR MEMORY

(75) Inventors: Suleyman A. Yolar, Irvine, CA (US); John Minh Hon Quan, Cerritos, CA (US); Choo-Bhin Ong, Foothill Ranch, CA (US); Kameron K. Jung, Yorba Linda, CA (US); Cheng Fatt Yee, Subang Jaya (MY)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/103,851

(22) Filed: May 9, 2011

Related U.S. Application Data

(63) Continuation-in-part of application No. 12/751,696, filed on Mar. 31, 2010.

(51) Int. Cl.
*G06F 13/00* (2006.01)
(52) U.S. Cl. .................. 711/4; 711/E12.1; 711/E12.103
(58) Field of Classification Search .......................... None
See application file for complete search history.

(56) References Cited

U.S. PATENT DOCUMENTS

| | | | |
|---|---|---|---|
| 5,890,219 A | 3/1999 | Scaringella et al. | |
| 6,320,714 B1 | 11/2001 | Moon et al. | |
| 6,591,376 B1 | 7/2003 | VanRooven et al. | |
| 6,618,930 B1 | 9/2003 | Fish et al. | |
| 7,254,525 B2 | 8/2007 | Briggs et al. | |
| 7,430,659 B2 | 9/2008 | Jordan et al. | |
| 7,480,829 B2 * | 1/2009 | Dickenson et al. | 714/42 |
| 7,583,457 B2 | 9/2009 | Miller et al. | |
| 8,049,980 B1 * | 11/2011 | Emami | 360/31 |
| 2002/0032881 A1 | 3/2002 | Ng et al. | |
| 2002/0178351 A1 | 11/2002 | Ott | |
| 2004/0148478 A1 | 7/2004 | Leung | |
| 2004/0243385 A1 | 12/2004 | Rothman et al. | |
| 2005/0223372 A1 | 10/2005 | Borchers | |
| 2006/0236198 A1 | 10/2006 | Lintz, Jr. et al. | |
| 2007/0011493 A1 | 1/2007 | Du et al. | |
| 2007/0074068 A1 | 3/2007 | Hsieh | |
| 2007/0157015 A1 | 7/2007 | Swanson et al. | |
| 2007/0168564 A1 | 7/2007 | Conley et al. | |
| 2007/0214348 A1 | 9/2007 | Danielsen | |
| 2007/0292114 A1 * | 12/2007 | German et al. | 386/125 |
| 2008/0040596 A1 | 2/2008 | Mai et al. | |
| 2009/0100237 A1 | 4/2009 | Orikasa et al. | |

OTHER PUBLICATIONS

Office Action dated Apr. 18, 2012 from U.S. Appl. No. 12/751,696, 21 pages.

\* cited by examiner

*Primary Examiner* — Edward Dudek, Jr.
*Assistant Examiner* — Sean D Rossiter

(57) ABSTRACT

A method of operating a disk drive is disclosed, the disk drive comprising a head actuated over a disk surface, and a first non-volatile semiconductor memory (NVSM). Calibrated parameters are stored in the first NVSM, wherein the calibrated parameters for accessing the disk surface. Prior to altering the disk drive, the calibrated parameters are uploaded from the disk drive to a host. After altering the disk drive, the calibrated parameters are downloaded from the host to the disk drive and the calibrated parameters are stored in a second NVSM.

22 Claims, 5 Drawing Sheets

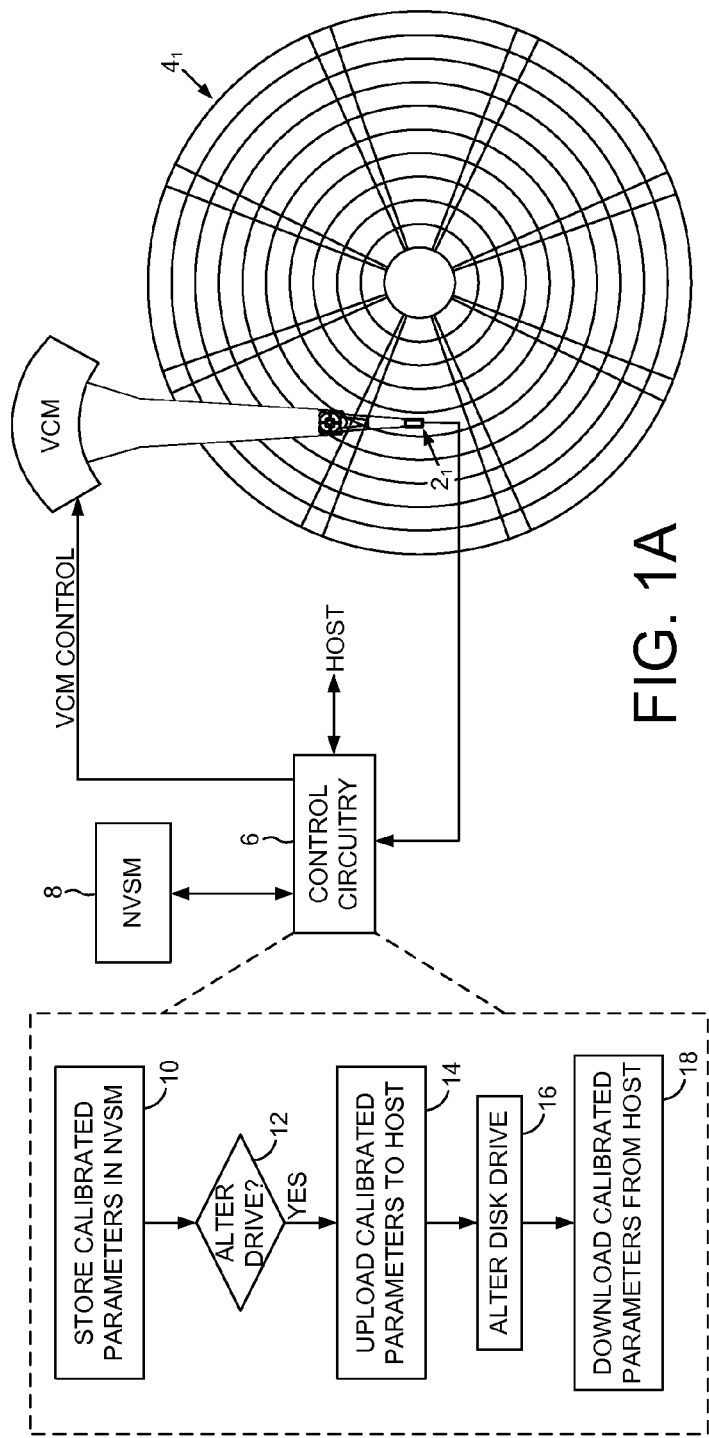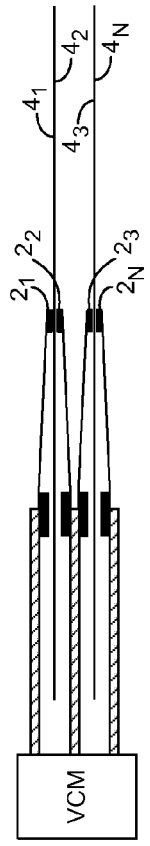

MODIFYING A DISK DRIVE WHILE PRESERVING CALIBRATED PARAMETERS STORED IN A NON-VOLATILE SEMICONDUCTOR MEMORY

This application is a continuation-in-part of U.S. patent application Ser. No. 12/751,696 filed on Mar. 31, 2010 the specification of which is incorporated herein by reference.

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

When manufacturing a disk drive, a number of tests are typically performed in order to calibrate various parameters associated with accessing each disk surface. For example, a bias setting may be calibrated for each head that enables the read element to read data from a corresponding disk surface. Other parameters that may be calibrated include read channel parameters, such as equalizer settings, gain settings, sequence detector settings, etc. that enable accurate demodulation of the read signal generated by each head. If a head is determined to be defective (read or write element), the head is typically disabled and the corresponding head/disk pair not used in the disk drive.

BRIEF DESCRIPTION OF THE DRAWINGS

FIG. 1A shows a disk drive according to an embodiment of the present invention comprising a head actuated over a disk surface.

FIG. 1B is a flow diagram according to an embodiment of the present invention wherein calibrated parameters are uploaded to a host, the disk drive is altered, and then the calibrated parameters are downloaded from the host.

FIG. 1C shows an embodiment of the present invention wherein the disk drive comprises a plurality of heads actuated over respective disk surfaces.

FIG. 3C is a flow diagram according to an embodiment of the present invention wherein the calibrated parameters are copied from the NVSM to the VSM when the disk drive is powered on.

DETAILED DESCRIPTION OF EMBODIMENTS OF THE INVENTION

FIG. 1A shows a disk drive according to an embodiment of the present invention comprising a head $2_1$ actuated over a disk surface $4_1$, and a first non-volatile semiconductor memory (NVSM) 8, such as any suitable flash memory. The disk drive further comprises control circuitry 6 operable to execute the flow diagram of FIG. 1B, wherein calibrated parameters are stored in the first NVSM (step 10), and the calibrated parameters for accessing the disk surface $4_1$. Prior to altering the disk drive (step 12), the calibrated parameters are uploaded from the disk drive to a host (step 14). After altering the disk drive (step 16), the calibrated parameters are downloaded from the host to the disk drive and the calibrated parameters are stored in a second NVSM (step 18).

Any suitable parameters may be calibrated for the disk drive, and in one embodiment, a number of the parameters may be calibrated during one or more manufacturing procedures. Example parameters that may be calibrated include parameters associated with operating the head 2 (e.g., read/write bias signals), or parameters associated with processing the read signal during read operations (read channel parameters), or parameters associated with servoing the head $2_1$ over the disk surface $4_1$ (e.g., fly height parameter, seek parameter, etc.). In an embodiment shown in FIG. 1C, the disk drive comprises a plurality of heads $2_1$-$2_N$ actuated over respective disk surfaces $4_1$-$4_N$. During a manufacturing procedure, the heads are typically tested and if found defective, deactivated so that the head/disk pair is not used in the disk drive. Accordingly, in one embodiment the calibrated parameters stored in the NVSM 8 identify the defective heads to the control circuitry 6 when the disk drive is powered on. If the PCB comprising the NVSM 8 or the NVSM 8 itself is swapped, it is important to retain the defective head information so that the control circuitry does not attempt to access a deactivated head.

Figure 2A:
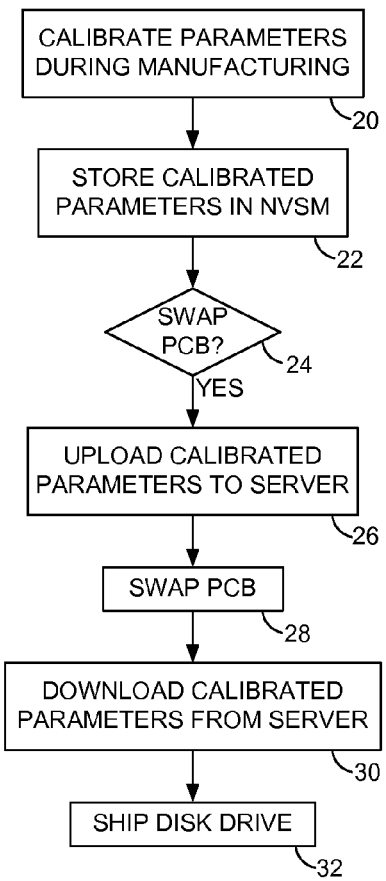
FIG. 2A is a flow diagram according to an embodiment of the present invention wherein the disk drive is altered by swapping a printed circuit board (PCB).

FIG. 2A shows a flow diagram according to an embodiment of the present invention wherein prior to shipping a disk drive it is subjected to a number of test procedures in order to calibrate various parameters (step 20). The calibrated parameters are stored in the NVSM 8 which in one embodiment is connected to a PCB. After calibrating the parameters, it may be desirable to swap out the PCB, for example to change the host interface circuitry and/or host connectors mounted on the PCB (e.g., change the disk drive from a SATA drive to a USB drive). This allows the test stations that test the disk drives during manufacturing to operate with a standard interface, wherein the disk drive may thereafter be converted into any desirable type (SATA, USB, etc.) prior to shipping to a target customer.

Referring again to the flow diagram of FIG. 2A, when the PCB is to be swapped (step 24), the calibrated parameters stored in the first NVSM 8 are uploaded to a host (step 26). The host may comprise any suitable computer, such as a personal computer, and in the embodiment of FIG. 2A, the host comprises a server that communicates with the disk drive (or test station) over a network such as a local area network or a wide area network (e.g., the Internet). After swapping the PCB (step 28), the calibrated parameters are downloaded from the host (step 30) and stored in the second (new) NVSM connected to the new PCB. The disk drive is then shipped to the target customer (step 32).

Figure 2B:
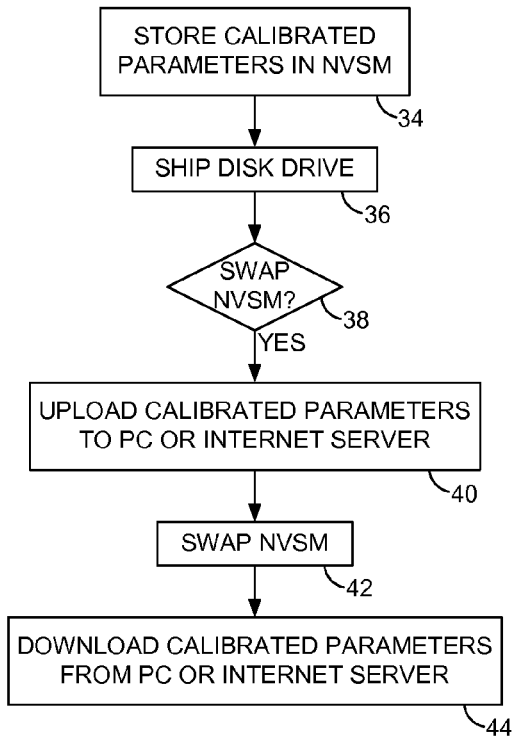
FIG. 2B is a flow diagram according to an embodiment of the present invention wherein the disk drive is altered by swapping a non-volatile semiconductor memory (NVSM).

FIG. 2B shows a flow diagram according to an embodiment of the present invention wherein after storing the calibrated parameters in the first NVSM (step 34), the disk drive is shipped to a target customer (step 36). While the disk drive is deployed in the field, the customer may want to swap the first NVSM (step 38), for example if the first NVSM nears a program/erase limit. Prior to swapping the first NVSM, the calibrated parameters are uploaded to a host (step 40) such as a personal computer or server. After swapping the first NVSM with a second NVSM (step 42), the calibrated parameters are downloaded from the host and stored in the second NVSM (step 44).

Figure 3A:
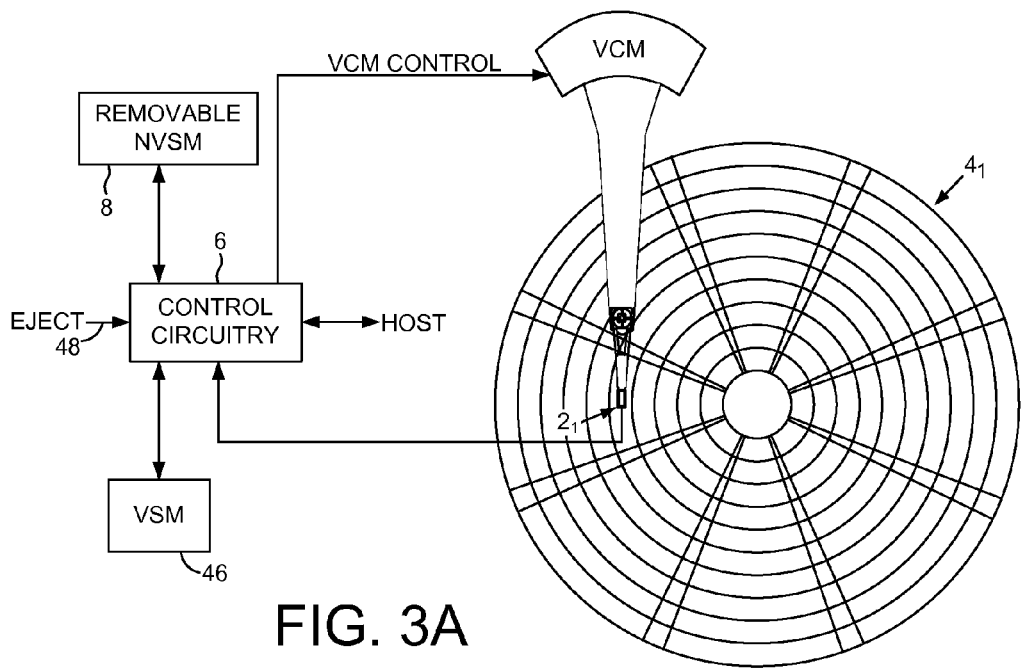
FIG. 3A shows a disk drive according to an embodiment of the present invention comprising a NVSM and a volatile semiconductor memory (VSM).

FIG. 3A shows a disk drive according to an embodiment of the present invention comprising a volatile semiconductor memory (VSM) 46 and an input for an eject signal 48 processed by the control circuitry 6 to eject the NVSM 8. It may be desirable to eject the NVSM 8 and replace it with a new one, for example if the NVSM 8 is failing or nearing end of life. In one embodiment, the NVSM 8 wears out, for example, by reaching a program/erase cycle limit, and therefore it may be desirable to replace the NVSM 8 with a new one. Before ejecting the old NVSM 8, the calibrated parameters are saved so they may be written to the new NVSM 8 when installed.

Figure 3B:
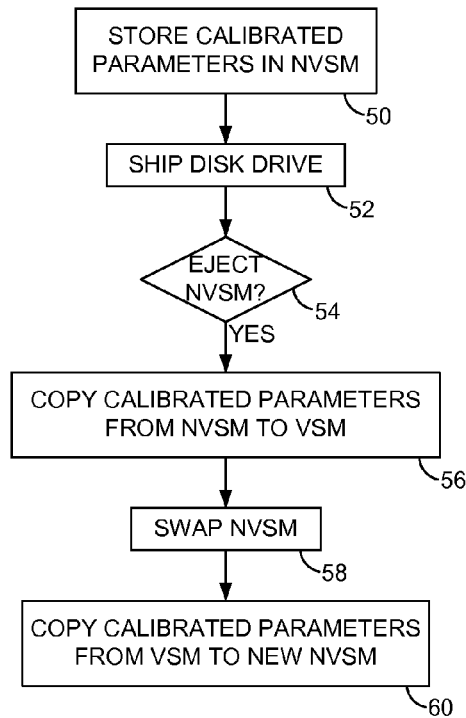
FIG. 3B is a flow diagram according to an embodiment of the present invention wherein the calibrated parameters are copied from the NVSM to the VSM prior to swapping the NVSM, and then copied from the VSM to the new NVSM.

FIG. 3B shows a flow diagram according to an example of this embodiment, wherein the calibrated parameters are initially stored in the NVSM during manufacturing of the disk drive (step 50). After shipping the disk drive (step 52) it may be determined that the NVSM should be replaced (step 54). Consequently, the calibrated parameters are copied from the NVSM to the VSM (step 56), the old NVSM is swapped with a new NVSM (step 58), and the calibrated parameters copied from the VSM to the new NVSM (step 60). In one embodiment, the calibrated parameters may be uploaded from the VSM to a host during the swap procedure to protect against losing the calibrated parameters in the event of a power failure.

Figure 3C:
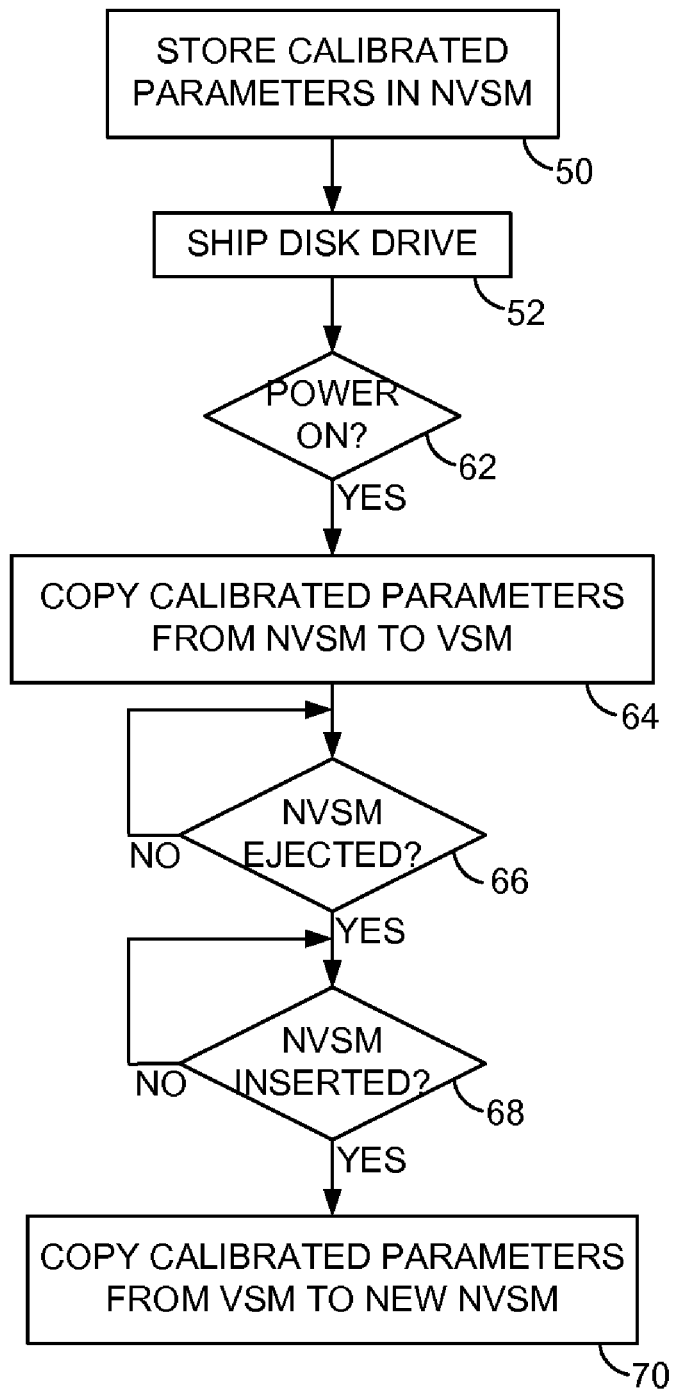

FIG. 3C shows an alternative embodiment of the present invention wherein each time the disk drive is powered on (step 62) the calibrated parameters are read from the NVSM and stored in the VSM (step 64). If the old NVSM is then ejected (step 66), and a new NVSM inserted (step 68), the calibrated parameters are copied from the VSM to the new NVSM (step 70). This embodiment avoids needing to read the calibrated parameters from the NVSM prior to ejecting the NVSM since the calibrated parameters are already stored in the VSM (at power on).

In one embodiment, the control circuitry 6 transmits a status to the host indicating the status of the NVSM (e.g., whether the NVSM should be replaced). The host may then notify the user to replace the NVSM, for example, through a pop-up window that includes a control button to eject the NVSM. When the user selects the eject button (in the pop-up window), the host transmits the eject signal to the control circuitry 6 which responds by preparing for the ejection (e.g., copying the calibrated parameters from the NVSM to the VSM). The control circuitry 6 may then notify the host that the user can safely eject the old NVSM and replace it with a new NVSM.

Figure 4A:
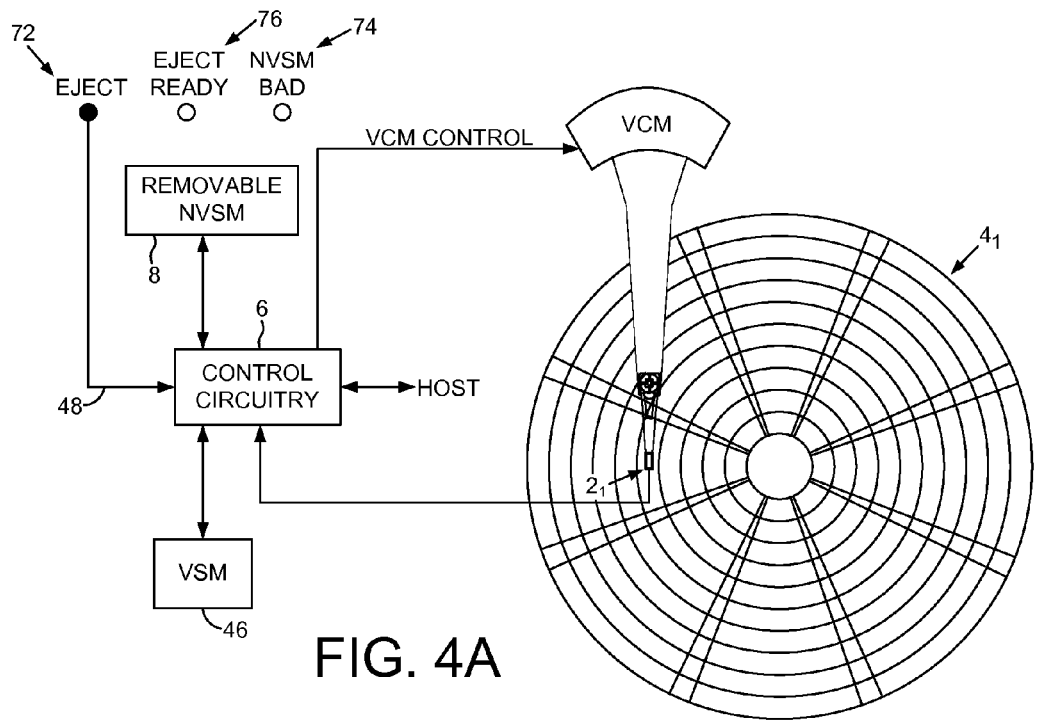
FIG. 4A shows a disk drive according to an embodiment of the present invention comprising an eject button for ejecting the NVSM, and light emitting diodes (LEDs) for indicating the status of the NVSM as well as whether it is safe to eject the NVSM.

FIG. 4A shows an alternative embodiment of the present invention wherein the disk drive comprises an eject button 72 on its housing for generating the eject signal 48 when pressed by a user. The housing of the disk drive also comprises a first LED 74 indicating the status of the NVSM (e.g., showing green for good and red for bad) and a second LED 76 indicating whether it is safe to eject the NVSM (e.g., red for not-ready and green for ready). This enables a user to evaluate the status of the NVSM and the eject readiness by viewing the LEDs, and to eject the NVSM by pressing the eject button. For example, a number of disk drives may be mounted in a rack of a multi-drive storage system, wherein the embodiment of FIG. 4A enables a user to quickly scan the status of each disk drive in the rack, and to safely replace an NVSM when needed.

Figure 4B:
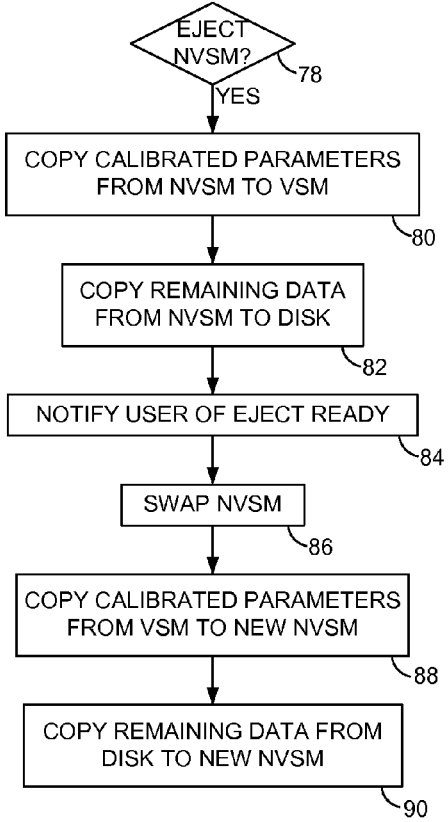
FIG. 4B is a flow diagram according to an embodiment of the present invention wherein prior to ejecting the NVSM, the calibrated parameters and other data are copied from the NVSM to the disk, and then the user is notified the NVSM may be ejected.

FIG. 4B shows an embodiment of the present invention wherein when the control circuitry receives the eject signal (via the host or user pressing a button) indicating the NVSM is about to be ejected (step 78), the calibrated parameters are copied from the NVSM to the VSM (step 80). In addition, at least some of the remaining data stored in the NVSM (e.g., user data) is copied to the disk surface (step 82). The user is then notified the NVSM may be ejected safely at step 84 (e.g., via a pop-up window on a host or an LED on the housing of the disk drive). After swapping the NVSM (step 86), the calibrated parameters are copied from the VSM to the new NVSM (step 88), and at least some of the data that was copied to the disk surface at step 82 is copied to the new NVSM (step 90). In an alternative embodiment, the calibrated parameters and/or the user data stored in the NVSM may be uploaded to a host, and then downloaded from the host and stored in the new NVSM.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A method of operating a disk drive, the disk drive comprising a head actuated over a disk surface, the method comprising:
storing calibrated parameters in a first non-volatile semiconductor memory (NVSM), wherein the calibrated parameters for accessing the disk surface;
prior to altering the disk drive, uploading the calibrated parameters from the disk drive to a host;
altering the disk drive; and
after altering the disk drive, downloading the calibrated parameters from the host to the disk drive and storing the calibrated parameters in a second NVSM.

2. The method as recited in claim 1, wherein:
the disk drive further comprises a first printed circuit board (PCB) comprising first control circuitry and the first NVSM; and
altering the disk drive comprises swapping the first PCB with a second PCB comprising second control circuitry and the second NVSM.

3. The method as recited in claim 1, wherein altering the disk drive comprises swapping the first NVSM with the second NVSM.

4. The method as recited in claim 1, wherein the host comprises a personal computer.

5. The method as recited in claim 1, wherein:
the host comprises a server connected to a network; and
the calibrated parameters are uploaded to the server and downloaded from the server over the network.

6. The method as recited in claim 5, wherein the network comprises the Internet.

7. The method as recited in claim 3, further comprising:
receiving an eject command to eject the NVSM; and
uploading the calibrated parameters to the host in response to the eject command.

8. The method as recited in claim 1, wherein:
the disk drive comprises a plurality of heads actuated over respective disk surfaces; and
the calibrated parameters identify defective heads.

9. A disk drive comprising:
a head actuated over a disk surface;
a first non-volatile semiconductor memory (NVSM);
a volatile semiconductor memory (VSM); and
control circuitry operable to:
  store calibrated parameters in the VSM and the first NVSM, wherein the calibrated parameters for accessing the disk surface;
  detect when the first NVSM has been swapped with a second NVSM; and
  copy the calibrated parameters from the VSM to the second NVSM.

10. The disk drive as recited in claim 9, wherein the control circuitry is further operable to:
receive an eject command; and
in response to the eject command, copy the calibrated parameters from the first NVSM to the VSM.

11. The disk drive as recited in claim 10, wherein the control circuitry is further operable to upload the calibrated parameters to a host.

12. The disk drive as recited in claim 10, wherein the control circuitry is further operable to receive the eject command from a host.

13. The disk drive as recited in claim 10, further comprising an eject button wherein the control circuitry is further operable to receive the eject command in response to the eject button.

14. The disk drive as recited in claim 9, wherein the control circuitry is further operable to:
receive an eject command;
in response to the eject command, copy data stored in the first NVSM to the disk; and
after the first NVSM is swapped with the second NVSM, copy at least part of the data from the disk to the second NVSM.

15. The disk drive as recited in claim 14, wherein the control circuitry is further operable to receive the eject command from a host.

16. The disk drive as recited in claim 14, further comprising an eject button wherein the control circuitry is further operable to receive the eject command in response to the eject button.

17. The disk drive as recited in claim 9, wherein the control circuitry is further operable to generate a visual indicator indicating the first NVSM should be swapped with the second NVSM.

18. The disk drive as recited in claim 17, wherein the disk drive further comprises a light emitting diode (LED) and the control circuitry generates the visual indicator by adjusting a state of the LED.

19. The disk drive as recited in claim 17, wherein the control circuitry is further operable to generate the visual indicator when the first NVSM approaches a program/erase cycle limit.

20. The disk drive as recited in claim 9, wherein the control circuitry is further operable to generate a visual indicator indicating the first NVSM can be safely ejected from the disk drive.

21. The disk drive as recited in claim 20, wherein the disk drive further comprises a light emitting diode (LED) and the control circuitry generates the visual indicator by adjusting a state of the LED.

22. The disk drive as recited in claim 9, wherein:
the disk drive comprises a plurality of heads actuated over respective disk surfaces; and
the calibrated parameters identify defective heads.

* * * * *